US012671346B2

(12) United States Patent
Shen et al.

(10) Patent No.:   US 12,671,346 B2
(45) Date of Patent:       Jun. 30, 2026

(54) HIGH-PERFORMANCE CONTROL METHOD FOR CARRIER- BASED MODULATION T-TYPE THREE-LEVEL CONVERTERS

(71) Applicant: NORTHWESTERN POLYTECHNICAL UNIVERSITY, Xi'an city (CN)

(72) Inventors: Ke Shen, Xi'an city (CN); Min Zhang, Xi'an city (CN); Kaixuan Gao, Xi'an city (CN); Yujia Cao, Xi'an city (CN); Peixin Liang, Xi'an city (CN)

(73) Assignee: NORTHWESTERN POLYTECHNICAL UNIVERSITY (CN)

( * ) Notice: Subject to any disclaimer, the term of this patent is extended or adjusted under 35 U.S.C. 154(b) by 188 days.

(21) Appl. No.: 18/776,294

(22) Filed: Jul. 18, 2024

(65) Prior Publication Data

US 2026/0005622 A1      Jan. 1, 2026

(30) Foreign Application Priority Data

Jun. 27, 2024    (CN) .......................... 202410852071.8

(51) Int. Cl.
*H02M 1/12*          (2006.01)
*H02M 7/487*        (2007.01)
(52) U.S. Cl.
CPC ........... *H02M 7/487* (2013.01); *H02M 1/123* (2021.05)

(58) Field of Classification Search
CPC .......... H02M 7/487; H02M 7/48; H02M 7/44; H02M 7/4803; H02M 7/4807; H02M 7/4818; H02M 7/48349; H02M 7/497; H02M 7/501; H02M 1/123; H02M 1/12; H02M 1/14; H02M 1/15; H02M 1/081; H02M 1/082
See application file for complete search history.

(56) References Cited

U.S. PATENT DOCUMENTS

| | | | | |
|---|---|---|---|---|
| 2013/0223651 A1* | 8/2013 | Hoyerby | ................. | H03F 3/187 |
| | | | | 381/120 |
| 2015/0200602 A1* | 7/2015 | Narimani | ............ | H02M 5/4585 |
| | | | | 363/37 |
| 2023/0137557 A1* | 5/2023 | Yamamoto | ............ | H02M 1/143 |
| | | | | 363/131 |

* cited by examiner

*Primary Examiner* — Nguyen Tran

(57)                    ABSTRACT

The invention relates to a high-performance control method for carrier-based modulation T-type three-level converters. The method includes: S1, representing the mathematical model of the converter using the switching function; S2, representing the three-phase modulation signal using the sine function, and representing upper and lower carrier signals using the piecewise function; S3, determining the time distribution of the converter switching state and obtaining the critical phase shift angle of the lower carrier under the switching state without maximum common-mode voltage; S4, sampling voltage values of two DC-side capacitors and using the voltage difference as the basis for left or right shifts of the lower carrier; S5, comparing the three-phase modulation wave with the upper and lower carriers to output the switching pulse signal. This method addresses neutral-point potential balance, common-mode voltage suppression, and reduces digital processor resource usage during PWM modulation.

10 Claims, 6 Drawing Sheets

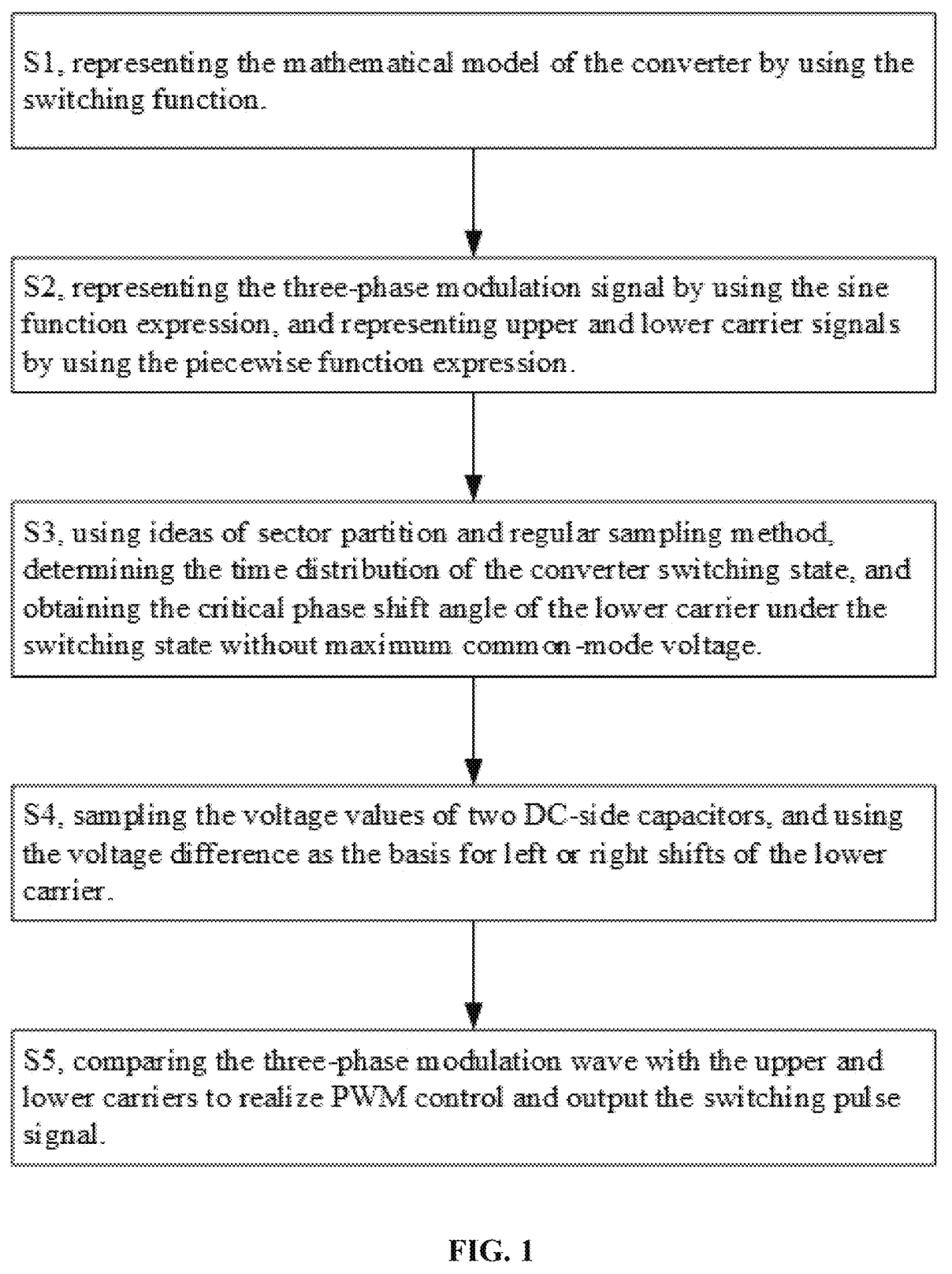

S1, representing the mathematical model of the converter by using the switching function.

S2, representing the three-phase modulation signal by using the sine function expression, and representing upper and lower carrier signals by using the piecewise function expression.

S3, using ideas of sector partition and regular sampling method, determining the time distribution of the converter switching state, and obtaining the critical phase shift angle of the lower carrier under the switching state without maximum common-mode voltage.

S4, sampling the voltage values of two DC-side capacitors, and using the voltage difference as the basis for left or right shifts of the lower carrier.

S5, comparing the three-phase modulation wave with the upper and lower carriers to realize PWM control and output the switching pulse signal.

FIG. 1

HIGH-PERFORMANCE CONTROL METHOD FOR CARRIER- BASED MODULATION T-TYPE THREE-LEVEL CONVERTERS

TECHNICAL FIELD

The invention relates to the field of aviation power conversion technology, in particular to a high-performance control method for carrier-based modulation T-type three-level converters.

BACKGROUND ART

In the power system of more electric aircraft, power electronic converter plays a core role. They are responsible for converting the direct current provided by the power supply system into alternating current suitable for different electrical loads, so as to meet the power requirements of aircraft components. As a common topology, T-type three-level converter has been widely used in the power system of more electric aircraft. T-type three-level converter has many advantages, which makes it an ideal choice for the power system of more electric aircraft. Firstly, it can provide efficient power conversion, thereby reducing energy consumption and carbon emission. Secondly, the T-type structure makes the converter have lower voltage stress and noise level, which is crucial for the electronic system of the aircraft. In addition, the T-type three-level converter also has the characteristics of small size, light weight and high reliability, which is suitable for the high performance and high reliability requirements of the more electric aircraft for the aviation power system.

However, due to the unique capacitance distribution structure of the three-level converter, there are some challenges when adopting pulse width modulation (PWM). The parasitic parameters of the actual capacitor and the influence of the dead time may lead to the problem of voltage DC bias, resulting in the imbalance of the neutral-point potential, which in turn affects the output characteristics, increases the harmonic content, and may shorten the lifetime of the DC capacitor and increase the voltage stress of the switching device, which will bring security risks. At the same time, the PWM control method may also cause common-mode voltage problem, so as to affect the system leakage current and produce electromagnetic compatibility problems.

At present, there are usually two solutions for solving these two problems. One is to change the hardware topology of the converter, but this will increase the additional hardware cost and control complexity. Another method is to optimize the existing modulation strategy through software. Space vector pulse width modulation (SVPWM) and carrier-based pulse width modulation (CBPWM) are common PWM techniques used to control the T-type three-level converter. In these two technologies, the optimized SVPWM needs to rearrange the order of vector action and recalculate the action time, which will consume more computational resources of digital processor. In contrast, the optimized CBPWM technology is a simpler and more practical method for the output control of the converter. For example, the optimal control of the target can be achieved by injecting a zero-sequence component into the modulation wave of CBPWM. However, the injected zero-sequence component is usually not a simple and regular waveform, especially with the increase of optimization objectives, the constraints on the zero-sequence component become more stringent, resulting in an increase of control complexity. However, the actual control system requires a simple and reliable control process, so the importance of developing a multi-objective simultaneous optimization control strategy for common-mode voltage and neutral-point potential is obvious.

SUMMARY OF THE INVENTION

The purpose of the invention is to provide a high-performance control method for carrier-based modulation T-type three-level converters, which can solve the problems of neutral-point potential balance and common-mode voltage suppression of T-type three-level converter when the PWM modulation is adopted in the existing technology, and in the process, the computational resources of the digital processor are seriously occupied.

In order to achieve the above purpose, the invention provides a high-performance control method for carrier-based modulation T-type three-level converters, comprising neutral-point potential balance and common-mode voltage suppression, the specific steps are as follows:

S1, representing a mathematical model of T-type three-level converter by using a switching function;

S2, representing a three-phase modulation signal by using a sine function expression, and representing upper and lower carrier signals by using a piecewise function expression.

S3, using ideas of sector partition and regular sampling method, determining a time distribution of a converter switching state, and obtaining a critical phase shift angle of a lower carrier under the switching state without a maximum common-mode voltage.

S4, sampling voltage values of two DC-side capacitors, and using a voltage difference as a basis for left or right shifts of a lower carrier;

S5, comparing a three-phase modulation wave with the upper and lower carriers to realize PWM control and output a switching pulse signal.

Preferably, in S1, a working principle of the T-type three-level converter is described by a switching function method, and switching function expressions of output voltage and load voltage are obtained, and then the switching function expression of common-mode voltage are derived by using above two. According to an output level state of the T-type three-level converter, the switching function values of each phase representing the output level are 1, 0 or −1, and these values are substituted into common-mode voltage expression. Under the carrier-based sinusoidal pulse width modulation, there are 25 combinations of converter switching state, excluding [1, 1, 1] and [−1, −1, −1]. And a final common-mode voltage will only have three cases, if DC-side voltage is expressed as $V_{dc}$, then amplitudes of these three common-mode voltages are $V_{dc}/3$, $V_{dc}/6$ and 0 respectively, and the maximum common-mode voltage is $\pm V_{dc}/3$.

Preferably, common-mode voltage switching function of the converter is expressed as:

$$V_{CMV} = \frac{V_{dc}}{6} \cdot (S_A + S_B + S_C).$$

wherein $S_A$, $S_B$ and $S_C$ are the switching state functions of the T-type three-level converter.

Preferably, in S2, output information of the converter is collected by a voltage sensor or a resistance divider, and a fundamental amplitude of the load voltage is obtained by Fourier decomposition method, then it is compared with maximum amplitude value for normalized processing to obtain modulation information. And then the sinusoidal function expression of the three-phase modulation signal is made, the piecewise function is used to represent the upper carrier and the phase-shifted lower carrier by using a switching period as a piecewise interval.

Preferably, the expression of the three-phase modulation signal:

$$\begin{cases} u_{ra} = m \cdot \sin(\omega_r t + \pi/6) \\ u_{rb} = m \cdot \sin(\omega_r t - \pi/2) \\ u_{rc} = m \cdot \sin(\omega_r t + 5\pi/6) \end{cases}.$$

the expressions of the upper carrier and the phase-shifted lower carrier:

$$u_{c1} = \begin{cases} -2\omega_c t + (2k+1), \quad k = 0, 1, 2 \ldots n-1 \\ \qquad t \in [kT_c, kT_c + T_c/2] \\ 2\omega_c t - (2k+1), \quad k = 0, 1, 2 \ldots n-1 \\ \qquad t \in [kT_c + T_c/2, (k+1)T_c] \end{cases}$$

$$u_{c2} = \begin{cases} -2\omega_c(t + T_c \cdot \theta/2\pi) + 2k, \quad k = 0, 1, 2 \ldots n-1 \\ \qquad t \in [kT_c, kT_c + T_c/2] \\ 2\omega_c(t + T_c \cdot \theta/2\pi) - (2k+2), \quad k = 0, 1, 2 \ldots n-1 \\ \qquad t \in [kT_c + T_c/2, (k+1)T_c]. \end{cases}$$

wherein m is a modulation index, $\omega_r$ is an angular frequency of the modulation wave, $\omega_c$ is an angular frequency of carrier wave, and $T_c$ is the switching period, $\theta$ is a phase shift angle of the lower carrier.

Preferably, in S3, periodicity and symmetry are used to conduct sector partition on carrier and modulation waveforms in a unit power frequency period, so to obtain twelve similar sectors. Then, at a peak or a trough of the carrier wave in a single sector, time function of the converter switching state is determined according to regular sampling principle and geometric relationship. And the time function is used to determine the critical phase shift angle of the lower carrier.

Preferably, the time functions of the converter switching state and the critical phase shift angles of the lower carrier of twelve sectors are as follows:

The time function of sector 1 is:

$$\begin{cases} \delta_a = mT_c\sin\left[\omega_r \cdot (k+1/2)T_c + \pi/6\right] \\ \delta_b = T_c + mT_c\sin\left[\omega_r \cdot (k+1/2)T_c - \pi/2\right] \\ \delta_c = mT_c\sin\left[\omega_r \cdot (k+1/2)T_c + 5\pi/6\right] \end{cases}$$

The critical phase shift angle of the lower carrier of sector 1 is:

$$\theta^* = \frac{1}{2} \cdot \omega_c\,(\delta_b + \delta_c)$$

The time function of sector 2 is:

$$\begin{cases} T_c - \delta_a = T_c - mT_c\sin\left(\omega_r \cdot kT_c + \pi/6\right) \\ T_c - \delta_b = -mT_c\sin\left(\omega_r \cdot kT_c - \pi/2\right) \\ T_c - \delta_c = -mT_c\sin\left(\omega_r \cdot kT_c + 5\pi/6\right) \end{cases}$$

The critical phase shift angle of the lower carrier of sector 2 is:

$$\theta^* = \frac{1}{2} \cdot \omega_c\,[(T_c + \delta_a) + (T_c - \delta_c)]$$

The time function of sector 3 is:

$$\begin{cases} T_c - \delta_a = T_c - mT_c\sin\left(\omega_r \cdot kT_c + \pi/6\right) \\ T_c - \delta_b = -mT_c\sin\left(\omega_r \cdot kT_c - \pi/2\right) \\ T_c - \delta_c = -mT_c\sin\left(\omega_r \cdot kT_c + 5\pi/6\right) \end{cases}$$

The critical phase shift angle of the lower carrier of sector 3 is:

$$\theta^* = \frac{1}{2} \cdot \omega_c\,[(T_c + \delta_a) + (T_c - \delta_b)]$$

The time function of sector 4 is:

$$\begin{cases} \delta_a = mT_c\sin\left[\omega_r \cdot (k+1/2)T_c + \pi/6\right] \\ \delta_b = T_c + mT_c\sin\left[\omega_r \cdot (k+1/2)T_c - \pi/2\right] \\ \delta_c = mT_c\sin\left[\omega_r \cdot (k+1/2)T_c + 5\pi/6\right] \end{cases}$$

The critical phase shift angle of the lower carrier of sector 4 is:

$$\theta^* = \frac{1}{2} \cdot \omega_c\,(\delta_b + \delta_c)$$

The time function of sector 5 is:

$$\begin{cases} \delta_a = mT_c\sin\left[\omega_r \cdot (k+1/2)T_c + \pi/6\right] \\ \delta_b = mT_c\sin\left[\omega_r \cdot (k+1/2)T_c - \pi/2\right] \\ \delta_c = T_c + mT_c\sin\left[\omega_r \cdot (k+1/2)T_c + 5\pi/6\right] \end{cases}$$

The critical phase shift angle of the lower carrier of sector 5 is:

$$\theta^* = \frac{1}{2} \cdot \omega_c\,(\delta_a + \delta_c)$$

The time function of sector 6 is:

$$\begin{cases} T_c - \delta_a = T_c - mT_c\sin\left(\omega_r \cdot kT_c + \pi/6\right) \\ T_c - \delta_b = T_c - mT_c\sin\left(\omega_r \cdot kT_c - \pi/2\right) \\ T_c - \delta_c = -mT_c\sin\left(\omega_r \cdot kT_c + 5\pi/6\right) \end{cases}$$

The critical phase shift angle of the lower carrier of sector 6 is:

$$\theta^* = \frac{1}{2} \cdot \omega_c\,[(T_c + \delta_a) + (T_c - \delta_b)]$$

The time function of sector 7 is:

$$\begin{cases} T_c - \delta_a = T_c - mT_c\sin\left(\omega_r \cdot kT_c + \pi/6\right) \\ T_c - \delta_b = T_c - mT_c\sin\left(\omega_r \cdot kT_c - \pi/2\right) \\ T_c - \delta_c = -mT_c\sin\left(\omega_r \cdot kT_c + 5\pi/6\right) \end{cases}$$

The critical phase shift angle of the lower carrier of sector 7 is:

$$\theta^* = \frac{1}{2}\cdot\omega_c\left[(T_c - \delta_b) + (T_c - \delta_c)\right]$$

The time function of sector 8 is:

$$\begin{cases} \delta_a = T_c + mT_c\sin\left[\omega_r\cdot(k+1/2)T_c + \pi/6\right] \\ \delta_b = mT_c\sin\left[\omega_r\cdot(k+1/2)T_c - \pi/2\right] \\ \delta_c = mT_c\sin\left[\omega_r\cdot(k+1/2)T_c + 5\pi/6\right] \end{cases}$$

The critical phase shift angle of the lower carrier of sector 8 is:

$$\theta^* = \frac{1}{2}\cdot\omega_c\left(\delta_a + \delta_c\right)$$

The time function of sector 9 is:

$$\begin{cases} \delta_a = T_c + mT_c\sin\left[\omega_r\cdot(k+1/2)T_c + \pi/6\right] \\ \delta_b = mT_c\sin\left[\omega_r\cdot(k+1/2)T_c - \pi/2\right] \\ \delta_c = mT_c\sin\left[\omega_r\cdot(k+1/2)T_c + 5\pi/6\right] \end{cases}$$

The critical phase shift angle of the lower carrier of sector 9 is:

$$\theta^* = \frac{1}{2}\cdot\omega_c\left(\delta_a + \delta_b\right)$$

The time function of sector 10 is:

$$\begin{cases} T_c - \delta_a = -mT_c\sin\left(\omega_r\cdot kT_c + \pi/6\right) \\ T_c - \delta_b = -mT_c\sin\left(\omega_r\cdot kT_c - \pi/2\right) \\ T_c - \delta_c = T_c - mT_c\sin\left(\omega_r\cdot kT_c + 5\pi/6\right) \end{cases}$$

The critical phase shift angle of the lower carrier of sector 10 is:

$$\theta^* = \frac{1}{2}\cdot\omega_c\left[(T_c - \delta_b) + (T_c - \delta_c)\right]$$

The time function of sector 11 is:

$$\begin{cases} T_c - \delta_a = -mT_c\sin\left(\omega_r\cdot kT_c + \pi/6\right) \\ T_c - \delta_b = -mT_c\sin\left(\omega_r\cdot kT_c - \pi/2\right) \\ T_c - \delta_c = T_c - mT_c\sin\left(\omega_r\cdot kT_c + 5\pi/6\right) \end{cases}$$

The critical phase shift angle of the lower carrier of sector 11 is:

$$\theta^* = \frac{1}{2}\cdot\omega_c\left[(T_c - \delta_a) + (T_c - \delta_c)\right]$$

The time function of sector 12 is:

$$\begin{cases} \delta_a = mT_c\sin\left[\omega_r\cdot(k+1/2)T_c + \pi/6\right] \\ \delta_b = T_c + mT_c\sin\left[\omega_r\cdot(k+1/2)T_c - \pi/2\right] \\ \delta_c = mT_c\sin\left[\omega_r\cdot(k+1/2)T_c + 5\pi/6\right] \end{cases}$$

The critical phase shift angle of the lower carrier of sector 12 is:

$$\theta^* = \frac{1}{2}\cdot\omega_c\left(\delta_a + \delta_b\right)$$

Preferably, the phase shift angle range of the lower carrier is:

$$\pi \geq |\theta| \geq \theta^*.$$

Preferably, in S4, a voltage sensor or a resistance divider are used to sample the voltage values of two DC-side capacitors, and a phase shift direction of the lower carrier is determined according to the voltage difference between the two; the principle is that when the upper capacitor voltage is greater than the lower capacitor voltage, that is, $\Delta V_C > 0$, then the lower carrier is selected to move to right within the phase shift angle range to lift neutral-point potential; when the upper capacitor voltage is less than the lower capacitor voltage, that is, $\Delta V_C < 0$, then the phase shift angle range of the lower carrier is selected to move left to reduce neutral-point potential, and on this basis, a voltage difference limit is set.

Preferably, in S5, the upper carrier and the phase-shifted lower carrier are compared with normalized modulation signal respectively to obtain two sets of PWM pulse signals, and then the two signals are complementary assigned to four power switches of each phase bridge arm.

Therefore, the beneficial effects of the high-performance control method for carrier-based modulation T-type three-level converters are as follows:

(1) The neutral-point potential balance and common-mode voltage suppression of T-type three-level converter can be realized only by conducting phase shift on the lower carrier of CBPWM modulation without additional zero-sequence component injection, and the output characteristics of T-type three-level converter can be optimized, and the method is easy to implement.

(2) The method of the invention can effectively reduce the common-mode voltage amplitude to half of the original, and can ensure that the neutral-point potential of the DC side restores balance when the DC bias occurs and remains within a constant range.

(3) The method of the invention does not require complex on-line calculation, and reducing the burden of the digital processor is easy to implement.

The following is a further detailed description of the technical scheme of the invention through drawings and embodiments.

BRIEF DESCRIPTION OF DRAWINGS

FIG. 1 is the step flow chart of the high-performance control method for carrier-based modulation T-type three-level converters.

DETAILED DESCRIPTION OF THE INVENTION

Figure 2:
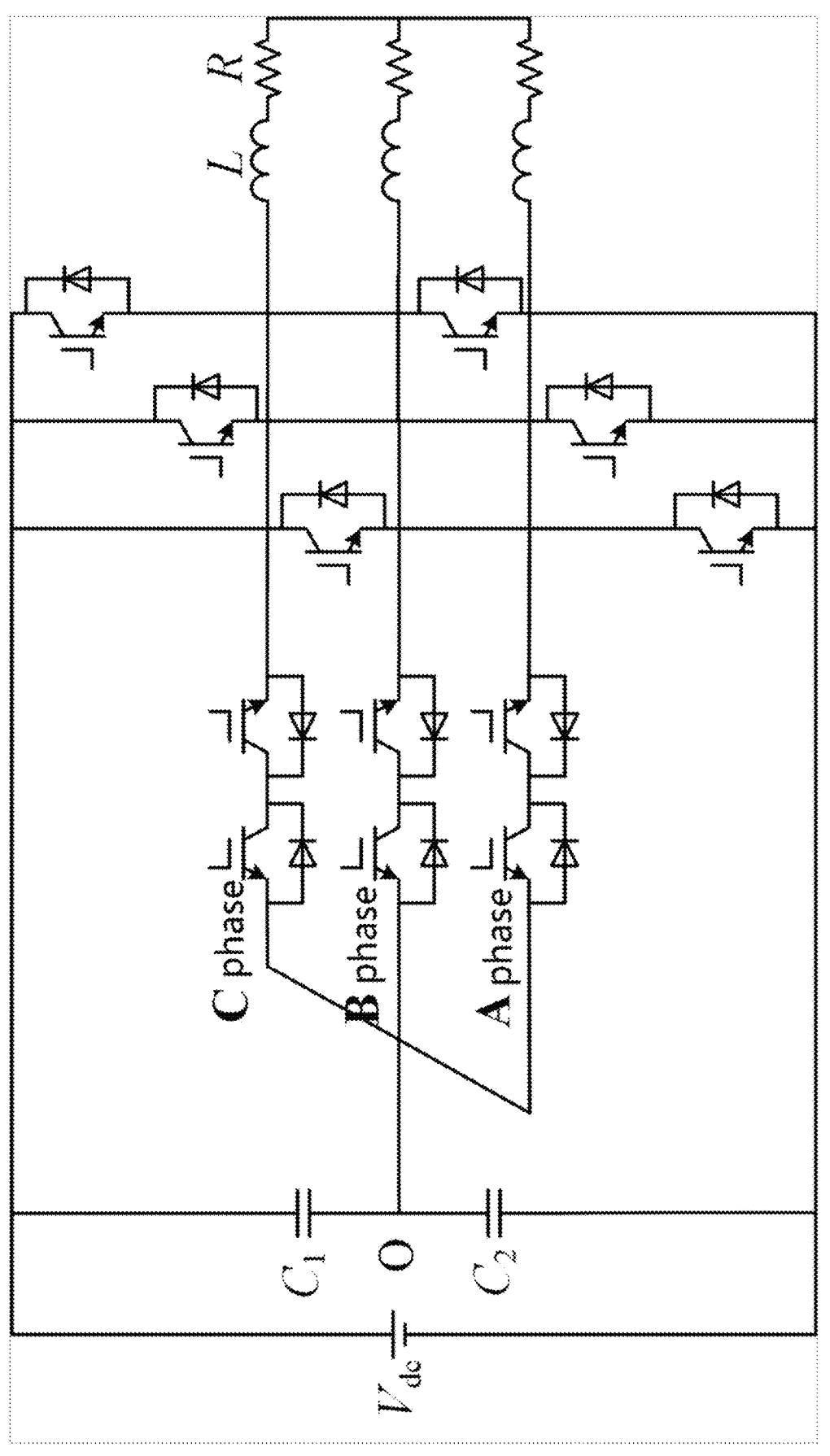
FIG. 2 is the topology diagram of the T-type three-level converter.

The technical scheme of the invention is further explained below by drawings and embodiments.

Unless otherwise defined, the technical terms or scientific terms used in the invention should be understood by people with general skills in the field to which the invention belongs. The words 'first', 'second', and the like used in this invention do not represent any order, quantity, or importance, but are only used to distinguish different components. Similar words such as 'include' or 'comprise' mean that the elements or objects appearing before the word cover the elements or objects listed after the word and their equivalents, without excluding other elements or objects. Similar words such as 'connected' or 'linked' are not limited to physical or mechanical connections, but can comprise electrical connections, whether direct or indirect. 'Up', 'down', 'left', 'right', etc. are only used to represent relative positional relationships, when the absolute position of the described object changes, the relative positional relationship may also change accordingly.

Embodiment 1

As shown in FIG. 1, the invention provides a high-performance control method for carrier-based modulation T-type three-level converters, comprising neutral-point potential balance and common-mode voltage suppression. On the basis of the traditional CBPWM method, the relationship between the phase shift angle of the lower carrier and the common-mode voltage suppression and neutral-point potential balance is comprehensively considered. In order to achieve the elimination of the highest amplitude of the common-mode voltage and the redistribution of active power, which can ensure the balance of the neutral-point potential during the normal operation of the converter, the specific steps are as follows:

S1, representing the mathematical model of the converter by using the switching function.

The output state of the T-type three-level converter is mathematically expressed by the switching function, and the common-mode voltage equation is obtained after simplification. According to the equation, the relationship between the three-phase switching state of the converter and the common-mode voltage amplitude is determined, as well as the three-phase switching state corresponding to the high common-mode voltage that needs to be eliminated.

S2, representing the three-phase modulation signal by using the sine function expression, and representing upper and lower carrier signals by using the piecewise function expression.

The physical information such as the load voltage at the output end of the T-type three-level converter is sampled, and the fundamental amplitude of the voltage is normalized. The three-phase modulation signal is expressed by using the sinusoidal function, and the upper carrier and the phase-shifted lower carrier are represented by using the piecewise function.

S3, using ideas of sector partition and regular sampling method, determining the time distribution of the converter switching state, and obtaining the critical phase shift angle of the lower carrier under the switching state without maximum common-mode voltage.

The carrier and modulation waveforms in the unit power frequency period are conducted sector partition. And the time distribution of the converter switching state in a single sector is determined according to the principle of regular sampling. These results in the critical phase shift angle of the lower carrier for the switching state group that can eliminate the maximum common-mode voltage amplitude under different modulation indexes.

S4, sampling the voltage values of two DC-side capacitors, and using the voltage difference as the basis for left or right shifts of the lower carrier.

The voltage values of the two DC-side capacitors are sampled, and the difference between the two is used as the basis for the left or right shift of the lower carrier in the phase shift angle range. By setting the maximum difference limit, the hysteresis control of the neutral-point potential of the converter is realized.

S5, comparing the three-phase modulation wave with the upper and lower carriers to realize PWM control and output the switching pulse signal.

By comparing the upper carrier and the optimized lower carrier with the modulation signal, the pulse signal of the power switch is obtained to drive the converter. And the control of the neutral-point potential balance and common-mode voltage suppression of the converter is realized.

In order to further implement the above technical scheme, as shown in FIG. 2, the topology structure of the T-type three-level converter in FIG. 2 is composed of DC-side capacitors $C_1$, $C_2$ and AC-side three-phase bridge arms A, B, C. Each phase bridge arm is composed of four power switches in T-type form. The specific content of S1 is: the working principle of the converter is described by switching function method, and the switching function expressions of output voltage and load voltage are obtained, and then the switching function expression of common-mode voltage is derived by using the above two. According to the output level state of the converter, the switching function values of each phase representing the output level are 1, 0 or −1, and these values are substituted into common-mode voltage expression. Under the carrier-based sinusoidal pulse width modulation, there are 25 combinations of converter switching state, excluding [1,1,1] and [−1, −1, −1], as shown in Table 1:

TABLE 1

| Converter switching state. | | |
| --- | --- | --- |
| | Common-mode voltage amplitude | | |
| | 0 | $V_{dc}/6$ | $V_{dc}/3$ |
| Three-phase switching state $[S_A, S_B, S_C]$ | [0, 0, 0] | [1, 0, 0] | [0, 1, 1] |
| | [1, −1, 0] | [0, 1, 0] | [1, 0, 1] |
| | [1, 0, −1] | [0, 0, 1] | [1, 1, 0] |
| | [0, −1, 1] | [−1, 0, 0] | [0, −1, −1] |
| | [0, 1, −1] | [0, −1, 0] | [−1, 0, −1] |
| | [−1, 0, 1] | [0, 0, −1] | [−1, −1, 0] |
| | [−1, 1, 0] | [1, 1, −1] | |
| | | [1, −1, 1] | |
| | | [−1, 1, 1] | |
| | | [−1, −1, 1] | |
| | | [−1, 1, −1] | |
| | | [1, −1, −1] | |

A final common-mode voltage will only have three cases, if DC-side voltage is expressed as $V_{dc}$, then amplitudes of these three common-mode voltages are $V_{dc}/3$, $V_{dc}/6$ and 0 respectively, and the maximum common-mode voltage is $\pm V_{dc}/3$.

The common-mode voltage switching function of the converter is expressed as:

$$V_{CMV} = \frac{V_{dc}}{6} \cdot (S_A + S_B + S_C).$$

wherein $S_A$, $S_B$ and $S_C$ are the switching state functions of the T-type three-level converter.

The specific content of S2 is: the output information of the converter is collected by voltage sensor or resistance divider, and the fundamental amplitude of the load voltage is obtained by Fourier decomposition method, then it is compared with maximum amplitude value for normalized processing to obtain modulation information. And then the sinusoidal function expression of the three-phase modulation signal is made, the piecewise function is used to represent the upper carrier and the phase-shifted lower carrier by using the switching period as the piecewise interval.

The expression of the three-phase modulation signal:

$$\begin{cases} u_{ra} = m \cdot \sin\left(\omega_r t + \pi/6\right) \\ u_{rb} = m \cdot \sin\left(\omega_r t - \pi/2\right) \\ u_{rc} = m \cdot \sin\left(\omega_r t + 5\pi/6\right). \end{cases}$$

the expressions of the upper carrier and the phase-shifted lower carrier:

$$u_{c1} = \begin{cases} -2\omega_c t + (2k+1), \ k = 0, 1, 2 \dots n - 1 \\ \qquad t \in \left[kT_c, kT_c + T_c/2\right] \\ 2\omega_c t - (2k+1), \ k = 0, 1, 2 \dots n - 1 \\ \qquad t \in \left[kT_c + T_c/2, (k+1)T_c\right] \end{cases}$$

$$u_{c2} = \begin{cases} -2\omega_c \left(t + T_c \cdot \theta/2\pi\right) + 2k, \ k = 0, 1, 2 \dots n - 1 \\ \qquad t \in \left[kT_c, kT_c + T_c/2\right] \\ 2\omega_c \left(t + T_c \cdot \theta/2\pi\right) - (2k+2), \ k = 0, 1, 2 \dots n - 1 \\ \qquad t \in \left[kT_c + T_c/2, (k+1)T_c\right]. \end{cases}$$

wherein m is the modulation index, $\omega_r$ is the angular frequency of the modulation wave, $\omega_c$ is the angular frequency of carrier wave, and $T_c$ is the switching period, $\theta$ is the phase shift angle of the lower carrier.

Figure 3:
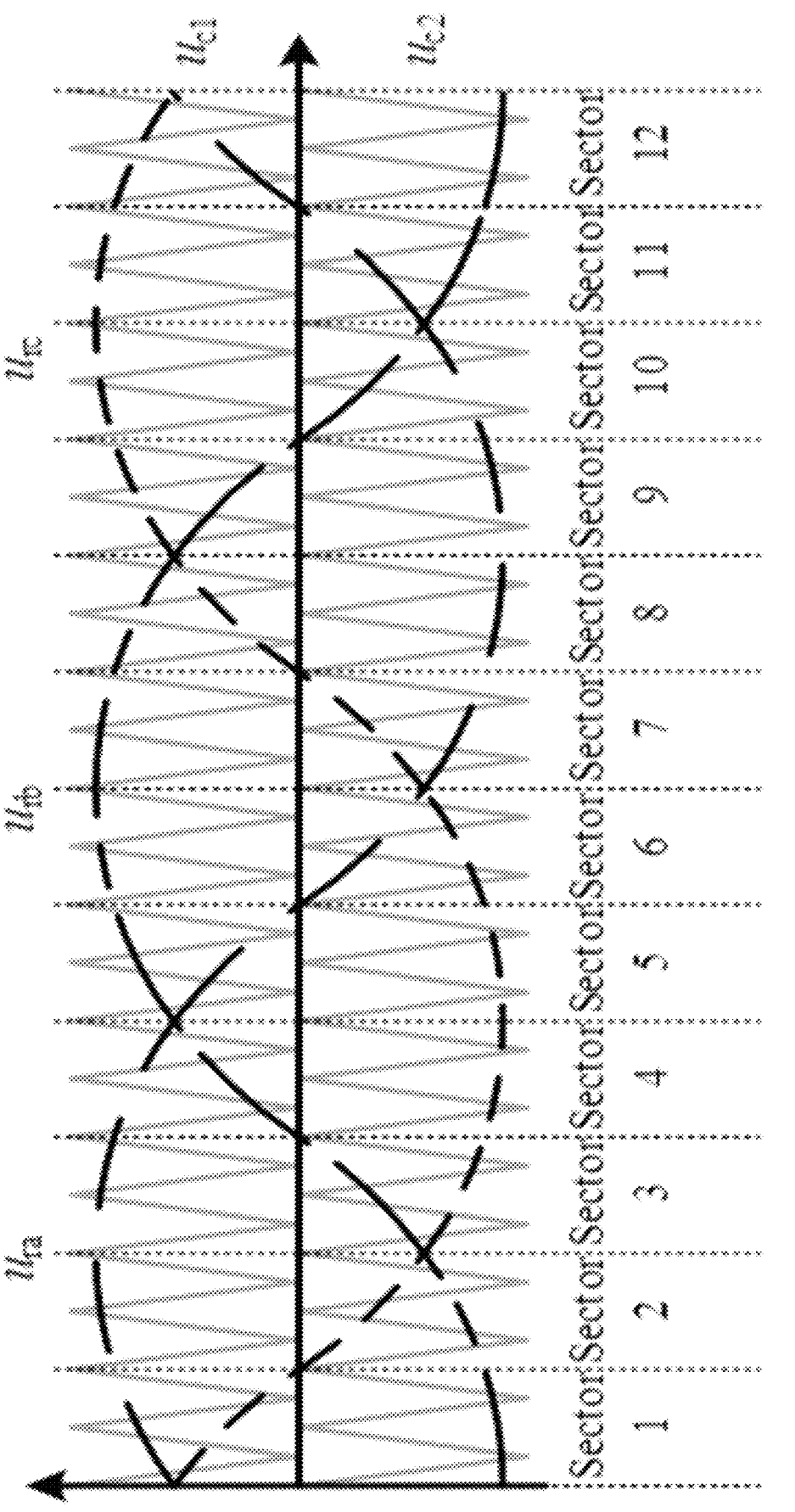
FIG. 3 is the sector partition diagram of the invention method.

As shown is FIG. 3, the specific content of S3 is: periodicity and symmetry are used to conduct sector partition on carrier and modulation waveforms in a unit power frequency period, so as to obtain twelve similar sectors. Then, at the peak or trough of the carrier wave in a single sector, and the time function of converter switching state is determined according to the regular sampling principle and geometric relationship. The time function is used to determine the critical phase shift angle of the lower carrier.

Taking the A phase and C phase modulation wave signals greater than zero and the B phase modulation wave signal less than zero as an example, that is, sector 1. The lower carrier is conducted phase shift, and the distribution stage of the B phase switching state on the time axis is changed. The critical phase shift angle of the lower carrier of the switching state group that can eliminate the maximum common-mode voltage amplitude can be found.

The time functions of B phase and C phase are:

$$\begin{cases} \delta_b = T_c + mT_c \sin\left[\omega_r \cdot (k + 1/2)T_c - 2\pi/3\right] \\ \delta_c = mT_c \sin\left[\omega_r \cdot (k + 1/2)T_c + 2\pi/3\right]. \end{cases}$$

The critical phase shift angle of the lower carrier is:

$$\theta^* = \frac{1}{2}\omega_c \delta_b + \frac{1}{2}\omega_c \delta_c = \pi\left(1 - \frac{1}{2}m\right)\text{rad}.$$

The phase shift angle range of the lower carrier is:

$$\pi \geq |\theta| \geq \theta^*.$$

Figure 4:
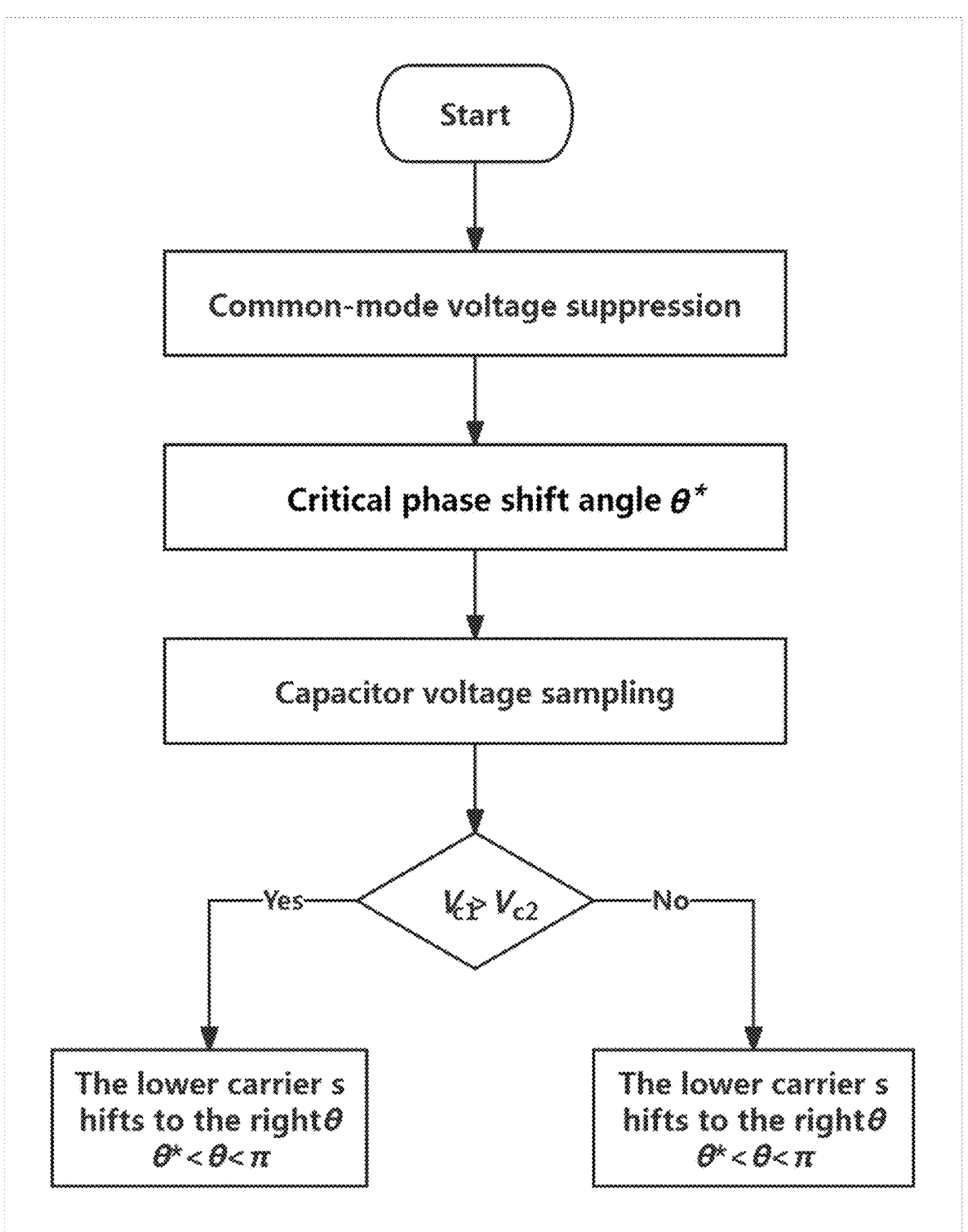
FIG. 4 is the flow chart of the method of the invention.

As shown in FIG. 4, the specific content of S4 is: the voltage sensor or the resistance divider are used to sample the voltage values of the two DC-side capacitors, and a phase shift direction of the lower carrier is determined according to the voltage difference between the two. The principle is that when the upper capacitor voltage is greater than the lower capacitor voltage, that is, $\Delta V_C > 0$, then the lower carrier is selected to move to right within the phase shift angle range to lift neutral-point potential; when the upper capacitor voltage is less than the lower capacitor voltage, that is, $\Delta V_C < 0$, the phase shift angle range of the lower carrier is selected to move left to reduce neutral-point potential. And on this basis, a voltage difference limit is set, that is, a hysteresis loop width, which ensures that the lower carrier is shifted to the left and right after the voltage difference reaches a certain level, so as to realize the hysteresis control.

The specific content of S5 is: it is almost consistent with the implementation method of the CBPWM modulation strategy, the upper carrier and the optimized lower carrier are compared with normalized modulation signal respectively to obtain two sets of PWM pulse signals, and then the two signals are complementary assigned to four power switches of each phase bridge arm.

The T-type three-level converter model is built in PLECS, and its parameters are shown in Table 2:

TABLE 2

| Parameters for the T-Type three-level converter | |
| --- | --- |
| System parameter | Parameter value |
| DC voltage/V | 270 |
| The upper capacitor parallel resistance/kΩ | 5 |

Figure 5:
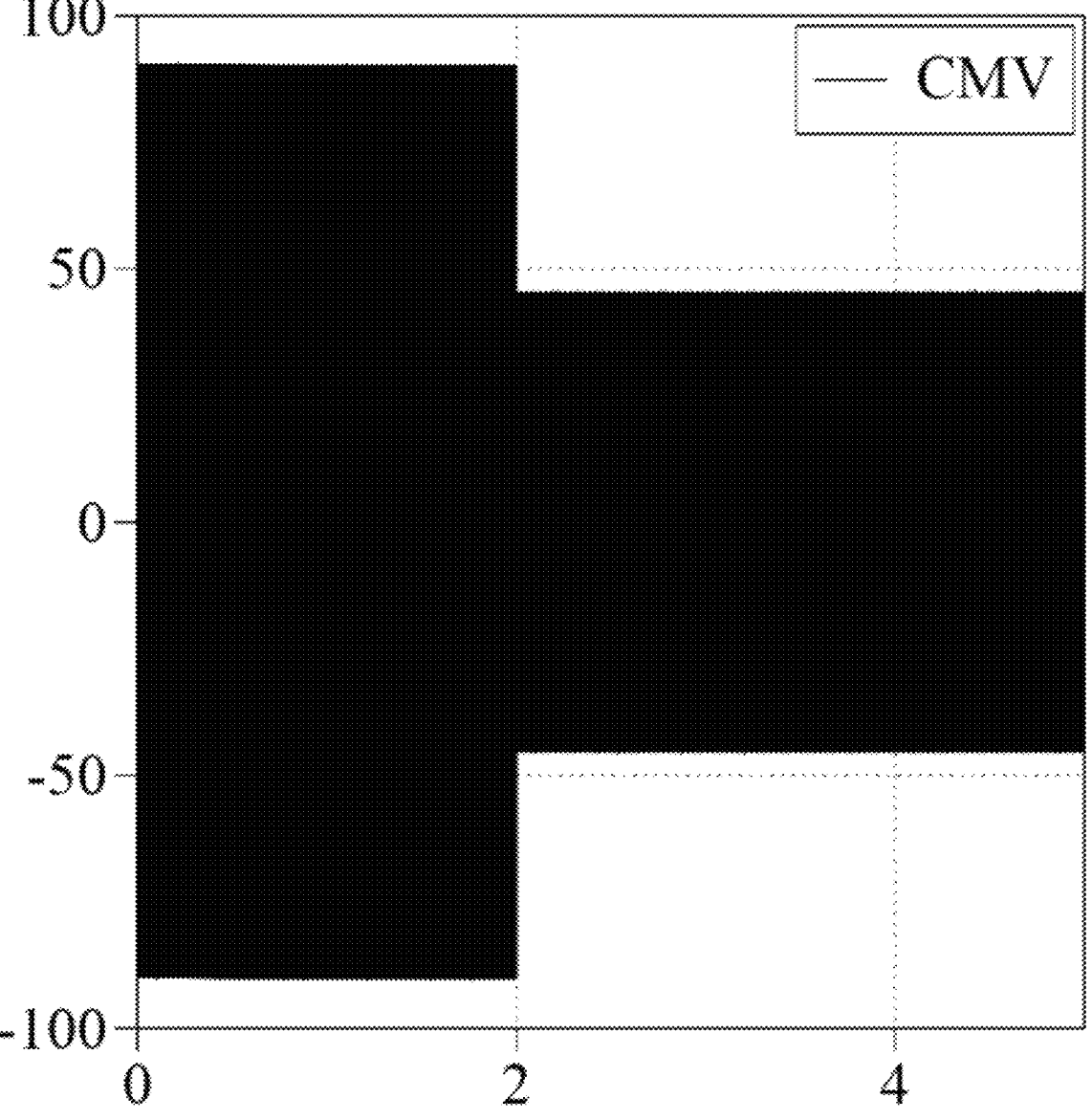
FIG. 5 is the common-mode voltage diagram of the T-type three-level converter before and after adopting the method of the invention.
Figure 6:
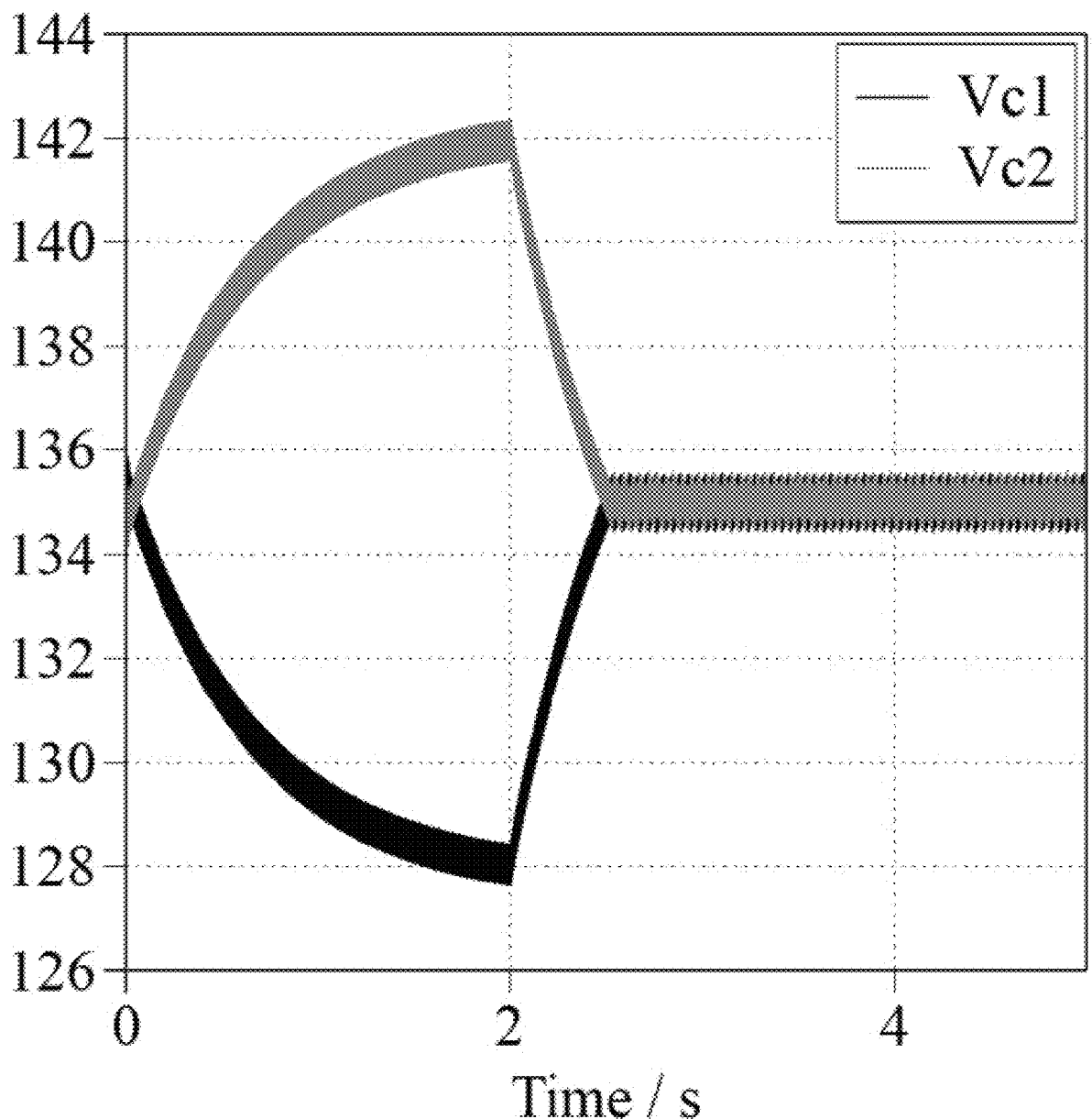
FIG. 6 is the diagram of the upper and lower capacitor voltages of the T-type three-level converter after adopting the method of the invention.

The simulation results are shown in FIG. 5 and FIG. 6, the upper capacitor is connected in parallel with a 5 kΩ resistance to simulate the actual non-equilibrium condition, the traditional CBPWM method is implemented in the first 2 seconds, and the method is switched to the method of the invention after 2 seconds, through the comparison before and after, it can be seen that the algorithm of neutral-point potential balance and common-mode voltage suppression can effectively achieve target optimization.

In summary, the simulation results fully verify that the proposed method is helpful to the neutral-point potential balance and common-mode voltage suppression of the T-type three-level converter.

Therefore, the invention adopts the carrier-based modulation high-performance control method for T-type three-level converters, which can solve the problems of neutral-point potential balance and common-mode voltage suppression of T-type three-level converter when PWM modulation is adopted in the existing technology, and in this process, the computational resources of the digital processor are seriously occupied.

Finally, it should be noted that the above embodiment is only used to explain the technical scheme of the invention rather than to restrict it, although the invention is described in detail with reference to the better embodiments, ordinary technicians in this field should understand that they can still modify or replace the technical scheme of the invention, and these modifications or equivalent replacements cannot make the modified technical scheme out of the spirit and scope of the technical scheme of the invention.

What is claimed is:

1. A high-performance control method for carrier-based modulation T-type three-level converters, comprising a neutral-point potential balance and a common-mode voltage suppression, the specific steps are as follows:

S1, representing a mathematical model of T-type three-level converter by using a switching function;

S2, representing a three-phase modulation signal by using a sine function expression, and representing upper and lower carrier signals by using a piecewise function expression;

S3, using ideas of a sector partition and a regular sampling method, determining a time distribution of a converter switching state, and obtaining a critical phase shift angle of a lower carrier under the switching state without a maximum common-mode voltage;

S4, sampling voltage values of two DC-side capacitors, and using a voltage difference as a basis for left or right shifts of a lower carrier;

S5, comparing a three-phase modulation wave with the upper and lower carriers to realize a PWM control and output a switching pulse signal.

2. The high-performance control method for the carrier-based modulation T-type three-level converters, according to claim 1, in S1, a working principle of the T-type three-level converter is described by a switching function, and switching function expressions of an output voltage and a load voltage are obtained, and the switching function expressions of the common-mode voltage are derived by using the switching function and switching function expressions according to an output level state of the T-type three-level converter, the switching function values of each phase representing the output level states are 1, 0 or −1, and values are substituted into a common-mode voltage expression, under a carrier-based sinusoidal pulse width modulation, there are 25 combinations of the converter switching state, excluding [1, 1, 1] and [−1, −1, −1], and a final common-mode voltage will only have three cases, if DC-side voltage is expressed as $V_{dc}$, then amplitudes of the three common-mode voltages are $V_{dc/3}$, $V_{dc}/6$ and 0 respectively, and the maximum common-mode voltage is $V_{dc}/3$.

3. The high-performance control method for the carrier-based modulation T-type three-level converters according to claim 2, the common-mode voltage switching function of the three-level converters are expressed as:

$$V_{CMV} = \frac{V_{dc}}{6} \cdot (S_A + S_B + S_C).$$

wherein $S_A$, $S_B$ and $S_C$ are the switching state functions of the T-type three-level converters.

4. The high-performance control method for the carrier-based modulation T-type three-level converters according to claim 1, in S2, output information of the converter is collected by a voltage sensor or a resistance divider, and a fundamental amplitude of the load voltage is obtained by Fourier decomposition method, then compared with maximum amplitude value for a normalized processing to obtain modulation information, and the sinusoidal function expression of the three-phase modulation wave is provide, the piecewise function is used to represent an the upper carrier and a phase-shifted of the lower carrier by using a switching period as a piecewise interval.

5. The high-performance control method for the carrier-based modulation T-type three-level converters according to claim 4, the expression of the three-phase modulation wave:

$$\begin{cases} u_{ra} = m \cdot \sin(\omega_r t + \pi/6) \\ u_{rb} = m \cdot \sin(\omega_r t - \pi/2) \\ u_{rc} = m \cdot \sin(\omega_r t + 5\pi/6). \end{cases}$$

the expressions of the upper carrier and the phase-shifted of the lower carrier:

$$u_{c1} = \begin{cases} -2\omega_c t + (2k+1), k = 0, 1, 2 \ldots n-1 \\ \qquad t \in [kT_c, kT_c + T_c/2] \\ -2\omega_c t - (2k+1), k = 0, 1, 2 \ldots n-1 \\ \qquad t \in [kT_c + T_c/2, (k+1)T_c] \end{cases}$$

$$u_{c2} = \begin{cases} -2\omega_c(t + T_c \cdot \theta/2\pi) + 2k, k = 0, 1, 2 \ldots n-1 \\ \qquad t \in [kT_c, kT_c + T_c/2] \\ 2\omega_c(t + T_c \cdot \theta/2\pi) - (2k+2), k = 0, 1, 2 \ldots n-1 \\ \qquad t \in [kT_c + T_c/2, (k+1)T_c]. \end{cases}$$

wherein m is a modulation index, $\omega_r$ is an angular frequency of the modulation wave, $\omega_c$ is an angular frequency of a carrier wave, and $T_c$ is the switching period, $\theta$ is the phase shift angle of the lower carrier.

6. The high-performance control method for the carrier-based modulation T-type three-level converters according to claim 1, in S3, periodicity and symmetry are used to conduct the sector partition on carrier and modulation waveforms in an unit power frequency period, to obtain twelve similar sectors, then, at a peak or a trough of the carrier wave in a single sector, a time function of the converter switching state is determined according to a regular sampling principle and a geometric relationship, and the time function is used to determine the critical phase shift angle of the lower carrier.

7. The high-performance control method for the carrier-based modulation T-type three-level converters according to claim 6, the time functions of the converter switching state and the critical phase shift angle of the lower carrier of twelve sectors are as follows:

the time function of sector 1 is:

$$\begin{cases} \delta_a = mT_c\sin[\omega_r \cdot (k+1/2)T_c + \pi/6] \\ \delta_b = T_c + mT_c\sin[\omega_r \cdot (k+1/2)T_c - \pi/2] \\ \delta_c = mT_c\sin[\omega_r \cdot (k+1/2)T_c + 5\pi/6] \end{cases}$$

the critical phase shift angle of the lower carrier of sector 1 is:

$$\theta^* = \frac{1}{2} \cdot \omega_c(\delta_b + \delta_c)$$

the time function of sector 2 is:

$$\begin{cases} T_c - \delta_a = T_c - mT_c\sin(\omega_r \cdot kT_c + \pi/6) \\ T_c - \delta_b = -mT_c\sin(\omega_r \cdot kT_c - \pi/2) \\ T_c - \delta_c = -mT_c\sin(\omega_r \cdot kT_c + 5\pi/6) \end{cases}$$

the critical phase shift angle of the lower carrier of sector 2 is:

$$\theta^* = \frac{1}{2} \cdot \omega_c[(T_c - \delta_a) + (T_c - \delta_c)]$$

the time function of sector 3 is:

$$\begin{cases} T_c - \delta_a = T_c - mT_c\sin(\omega_r \cdot kT_c + \pi/6) \\ T_c - \delta_b = -mT_c\sin(\omega_r \cdot kT_c - \pi/2) \\ T_c - \delta_c = -mT_c\sin(\omega_r \cdot kT_c + 5\pi/6) \end{cases}$$

the critical phase shift angle of the lower carrier of sector 3 is:

$$\theta^* = \frac{1}{2} \cdot \omega_c[(T_c - \delta_a) + (T_c - \delta_b)]$$

the time function of sector 4 is:

$$\begin{cases} \delta_a = mT_c\sin[\omega_r \cdot (k+1/2)T_c + \pi/6] \\ \delta_b = mT_c\sin[\omega_r \cdot (k+1/2)T_c - \pi/2] \\ \delta_c = T_c + mT_c\sin[\omega_r \cdot (k+1/2)T_c + 5\pi/6] \end{cases}$$

the critical phase shift angle of the lower carrier of sector 4 is:

$$\theta^* = \frac{1}{2} \cdot \omega_c(\delta_b + \delta_c)$$

the time function of sector 5 is:

$$\begin{cases} \delta_a = mT_c\sin[\omega_r \cdot (k+1/2)T_c + \pi/6] \\ \delta_b = mT_c\sin[\omega_r \cdot (k+1/2)T_c - \pi/2] \\ \delta_c = T_c + mT_c\sin[\omega_r \cdot (k+1/2)T_c + 5\pi/6] \end{cases}$$

the critical phase shift angle of the lower carrier of sector 5 is:

$$\theta^* = \frac{1}{2} \cdot \omega_c(\delta_a + \delta_c)$$

the time function of sector 6 is:

$$\begin{cases} T_c - \delta_a = -mT_c\sin(\omega_r \cdot kT_c + \pi/6) \\ T_c - \delta_b = T_c - mT_c\sin(\omega_r \cdot kT_c - \pi/2) \\ T_c - \delta_c = -mT_c\sin(\omega_r \cdot kT_c + 5\pi/6) \end{cases}$$

the critical phase shift angle of the lower carrier of sector 6 is:

$$\theta^* = \frac{1}{2} \cdot \omega_c[(T_c - \delta_a) + (T_c - \delta_b)]$$

the time function of sector 7 is:

$$\begin{cases} T_c - \delta_a = -mT_c\sin(\omega_r \cdot kT_c + \pi/6) \\ T_c - \delta_b = T_c - mT_c\sin(\omega_r \cdot kT_c - \pi/2) \\ T_c - \delta_c = -mT_c\sin(\omega_r \cdot kT_c + 5\pi/6) \end{cases}$$

the critical phase shift angle of the lower carrier of sector 7 is:

$$\theta^* = \frac{1}{2} \cdot \omega_c[(T_c - \delta_b) + (T_c - \delta_c)]$$

the time function of sector 8 is:

$$\begin{cases} \delta_a = T_c + mT_c\sin[\omega_r \cdot (k+1/2)T_c + \pi/6] \\ \delta_b = mT_c\sin[\omega_r \cdot (k+1/2)T_c - \pi/2] \\ \delta_c = mT_c\sin[\omega_r \cdot (k+1/2)T_c + 5\pi/6] \end{cases}$$

the critical phase shift angle of the lower carrier in sector 8 is:

$$\theta^* = \frac{1}{2} \cdot \omega_c(\delta_a + \delta_c)$$

<div style="display:flex; gap:2em;">
<div>

15 the time function of sector 9 is:

$$\begin{cases} \delta_a = T_c + mT_c\sin[\omega_r \cdot (k+1/2)T_c + \pi/6] \\ \delta_b = mT_c\sin[\omega_r \cdot (k+1/2)T_c - \pi/2] \\ \delta_c = mT_c\sin[\omega_r \cdot (k+1/2)T_c + 5\pi/6] \end{cases}$$

the critical phase shift angle of the lower carrier of sector 9 is:

$$\theta^* = \frac{1}{2} \cdot \omega_c(\delta_a + \delta_b)$$

the time function of sector 10 is:

$$\begin{cases} T_c - \delta_a = -mT_c\sin(\omega_r \cdot kT_c + \pi/6) \\ T_c - \delta_b = -mT_c\sin(\omega_r \cdot kT_c - \pi/2) \\ T_c - \delta_c = T_c - mT_c\sin(\omega_r \cdot kT_c + 5\pi/6) \end{cases}$$

the critical phase shift angle of the lower carrier of sector 10 is:

$$\theta^* = \frac{1}{2} \cdot \omega_c[(T_c - \delta_b) + (T_c - \delta_c)]$$

the time function of sector 11 is:

$$\begin{cases} T_c - \delta_a = -mT_c\sin(\omega_r \cdot kT_c + \pi/6) \\ T_c - \delta_b = -mT_c\sin(\omega_r \cdot kT_c - \pi/2) \\ T_c - \delta_c = T_c - mT_c\sin(\omega_r \cdot kT_c + 5\pi/6) \end{cases}$$

the critical phase shift angle of the lower carrier of sector 11 is:

$$\theta^* = \frac{1}{2} \cdot \omega_c[(T_c - \delta_a) + (T_c - \delta_c)]$$

</div>
<div>

16 the time function of sector 12 is:

$$\begin{cases} \delta_a = mT_c\sin[\omega_r \cdot (k+1/2)T_c + \pi/6] \\ \delta_b = T_c + mT_c\sin[\omega_r \cdot (k+1/2)T_c - \pi/2] \\ \delta_c = mT_c\sin[\omega_r \cdot (k+1/2)T_c + 5\pi/6] \end{cases}$$

the critical phase shift angle of the lower carrier of sector 12 is:

$$\theta^* = \frac{1}{2} \cdot \omega_c(\delta_a + \delta_b).$$

8. The high-performance control method for the carrier-based modulation T-type three-level converters according to claim 7, a phase shift angle range of the lower carrier is:

$$\pi \ge |\theta| \ge \theta^*.$$

9. The high-performance control method for the carrier-based modulation T-type three-level converters according to claim 1, in S4, a voltage sensor or a resistance divider are used to sample the voltage values of two DC-side capacitors, and a phase shift direction of the lower carrier is determined according to a voltage difference between the two DC-side capacitors when an upper capacitor voltage is greater than a lower capacitor voltage, that is, $\Delta V_C > 0$, then the lower carrier is selected to move to right within a phase shift angle range to lift aneutral-point potential; when the upper capacitor voltage is less than the lower capacitor voltage, that is, $\Delta V_C < 0$, then the phase shift angle range of the lower carrier is selected to move left to reduce the neutral-point potential, a voltage difference limit is set.

10. The high-performance control method for the carrier-based modulation T-type three-level converters according to claim 1, in S5, an upper carrier and a phase-shifted lower carrier are compared with a normalized modulation signal respectively to obtain two sets of PWM pulse signals, and the two signals are complementary assigned to four power switches of each phase bridge arm.

* * * * *

</div>
</div>